Jan. 21, 1941.  C. A. KOZA  2,229,509

ANGLE DRILL CONSTRUCTION

Filed Jan. 23, 1939

INVENTOR
CHARLES A. KOZA
BY
ATTORNEY

Patented Jan. 21, 1941

2,229,509

UNITED STATES PATENT OFFICE 2,229,509

ANGLE DRILL CONSTRUCTION

Charles A. Koza, Newark, N. J., assignor to Laura M. Koza

Application January 23, 1939, Serial No. 252,405

3 Claims. (Cl. 74—423)

This invention relates to angle drills for use in drilling holes in restricted places at an angle to the driving power thereof and the principal object of the invention is to provide a novel construction for an angle drill which will hold a drill in a perfect axial rotation to keep its cutting point from gyrating.

Another object of this invention is to provide the angle drill with novel adjusting means for taking up the wear of the movement transmitting members thereof.

A further object of this invention is to provide the angle drill with a novel combination of radial and end thrust antifriction bearings.

These and other objects and attendant advantages of this invention will become more clearly apparent from the detailed description thereof which follows, reference being had to the accompanying drawing in which Figure 1 is a longitudinal sectional view of a right angle drill embodying my invention.

Figure 1:
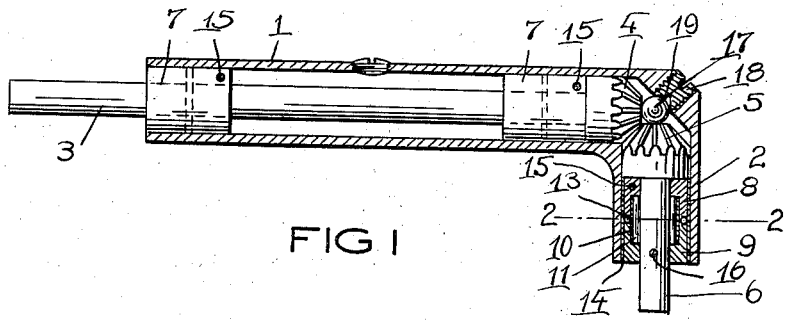
Figure 2:
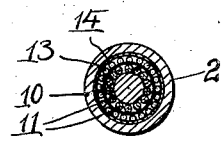
Figure 2 is a horizontal sectional view taken on the line 2—2 of Figure 1.

To make angle drills practical and useful they must be so constructed that the spindle which carries the drill is held perfectly true in its rotation. This is necessary because many times holes must be drilled in restricted spaces which prevent center punching or otherwise prelocating the holes to have the cutting edges of the drill enter the pre-marked or pre-started hole. A hole which is not pre-located by center punching can only be drilled with a true running drill that can be accurately held at the proper location. A drill which does not run true also has a gyrating cutting point which will cause the drill to bore a hole larger than its diameter.

The novel construction of the angle drill, forming the subject matter of my present invention, provides a combination of end thrust and radial antifriction bearings which keep the drill spindle in a perfectly true axial rotation and novel adjusting means provide for an adjustment of these bearings and take up the wear of the movement transmitting members in order to keep the drill spindle in its true axial rotation.

As illustrated in the figures of the drawing, the angle drill comprises a long tubular housing 1 with a short angular extension 2 at one end thereof. The tubular housing 1 serves as the handle for the tool and within it is mounted the driving spindle 3. The latter projects from the housing for the attachment of a flexible drive shaft or suitable motive power for the operation of the drill.

The driving spindle carries the bevel gear 4 which meshes with the bevel gear 5 of the driven spindle 6. The latter is mounted to rotate in the angular extension 2 of the housing and extends therefrom to have a chuck or other suitable drill holder attached thereto. The driving spindle is journaled in the housing 1 by means of two combined radial and end thrust antifriction bearings 7, 7 which are located at one end of the housing 1 and close to the bevel gear 4 respectively. The driven spindle is journaled in the extension 2 of the housing by means of a single combined radial and end thrust antifriction bearing 7.

All three of these combined radial and end thrust antifriction bearings are alike in their construction and comprise a pair of cylindrical shells 8 and 9, one of which is adapted to rotate on the spindle while the other rotates with the spindle. The bore of these shells is enlarged so as to telescope over and hold the sleeve 10 between them. The rollers 11 within the sleeve 10 are thus held to embrace the spindle to provide an elongated radial antifriction bearing for the spindle.

Between the opposing ends of the cylindrical shells 8 and 9 is located an antifriction ball bearing 13, the balls of which space the shells and form an end thrust bearing. A sleeve 14 surrounds the outside of the cylindrical shells with the ball bearing between them.

In the mounting of the combined radial and end thrust bearings within the housing 1 or its extension 2 the inner cylindrical shell of each bearing is fastened to the housing or its extension respectively by means of the pins 15 while the outer cylindrical shell of each of these bearings is fastened to the driving and driven spindle respectively by means of the pins 16 to cause them to rotate with the spindles.

The combined radial and end thrust bearings thus provided for the spindles are supplemented by an additional end thrust bearing in the form of a single antifriction ball member 17. This ball member is located between the bevel gears 4 and 5. An adjusting screw 18, carried by the housing 1 at its juncture with the angular extension 2 thereof, engages the ball member and a triangular central recess 19 in the end of the adjusting screw holds the ball member centrally seated thereon. The adjusting screw is thus adapted to hold the ball 17 to properly space the bevel gears with an antifriction bearing provided by the point contacts between the bevel gears and the ball. These point contacts between the ball and the bevel gear allow the ball to rotate and shift their bearing contacts over the entire area of the ball to keep the ball from wearing flat at the contact points.

Figure 3:
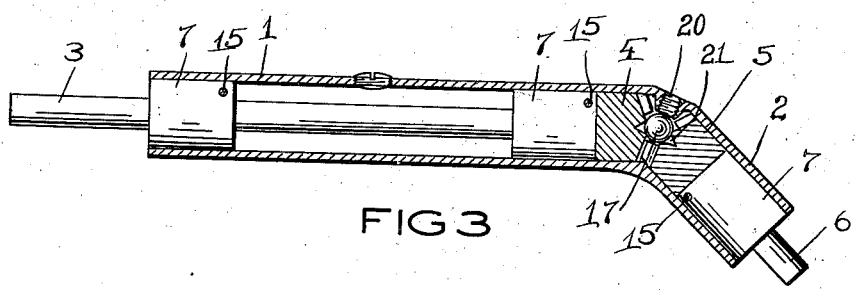
Figure 3 is a longitudinal sectional view of a modified form of the angle drill embodying my invention with the drilling spindle arranged to operate at an angle of 45 degrees to the drive shaft.

In the modification of the angle drill, illustrated in Figure 3, the bevel gears are provided with the conical pockets 21 so that the ball member 17 may simultaneously engage thereinto and be held therein by means of the adjusting screw 20. In this way both bevel gears will center themselves on the ball member which in turn is supported with a point contact on the flat end of the adjusting screw 20.

I claim:

1. In an angle drill the combination of a tubular housing, a tubular angularly arranged extension at one end of said housing, a spindle mounted to rotate in said tubular housing, a second spindle mounted to rotate in said tubular extension, a bevel gear carried by each of said spindles so as to mesh with each other at the juncture between the tubular housing and its tubular extension, an adjusting screw threaded transversely into the juncture between the housing and its extension and a rolling member held centrally against said bevel gears by said adjusting screw.

2. In an angle drill the combination as set forth in claim 1 in which said adjusting screw is provided with a conical depression at the end thereof to have its circular edges engage the rolling member in line with the axis of both of said spindles.

3. In an angle drill the combination as set forth in claim 1 in which said bevel gears are provided with conical depressions to have said adjusting screw hold said rolling member seated in both of said conical depressions.

CHARLES A. KOZA.